United States Patent [19]

Kullmann

[11] 4,038,492

[45] July 26, 1977

[54] CURRENT FEEDING DEVICE FOR ELECTRICAL APPARATUS WITH CONDUCTORS COOLED TO A LOW TEMPERATURE

[75] Inventor: Dieter Kullmann, Langenzenn, Germany

[73] Assignee: Siemens Aktiengesellschaft, Munich, Germany

[21] Appl. No.: 661,424

[22] Filed: Feb. 26, 1976

[30] Foreign Application Priority Data

Apr. 9, 1975 Germany .................. 2515477

[51] Int. Cl.² .......................................... H01B 12/00
[52] U.S. Cl. .................. 174/15 S; 174/15 CA; 174/126 S
[58] Field of Search ............. 174/15 CA, 15 S, 126 S, 174/128 S, 15 BH; 29/599

[56] References Cited

U.S. PATENT DOCUMENTS

| 3,286,014 | 11/1966 | Williams ..................... 174/15 CA |
| 3,349,161 | 10/1967 | Latham ....................... 174/15 CA |
| 3,371,145 | 2/1968 | Camille, Jr. ................. 174/15 CA |
| 3,542,937 | 11/1970 | Dammann et al. ............. 174/15 CA |
| 3,610,809 | 10/1971 | Eigenbrod .................... 174/15 S |
| 3,636,620 | 1/1972 | Long ........................ 174/15 S X |
| 3,654,377 | 4/1972 | Fleming et al. .............. 174/15 CA |
| 3,695,057 | 10/1972 | Moisson-Franckhauser ....... 174/15 CA X |
| 3,715,452 | 2/1973 | Long ......................... 174/15 S |
| 3,835,239 | 9/1974 | Schmidt et al. ............. 174/15 S X |
| 3,849,589 | 11/1974 | Schmidt et al. ............. 174/15 CA |

Primary Examiner—Arthur T. Grimley
Attorney, Agent, or Firm—Kenyon & Kenyon, Reilly, Carr & Chapin

[57] ABSTRACT

In a current feeding device for conductors which are cooled to a low temperature, the conductors being connected to a cooled normal conductor which consists of metal netting, metal net with constant conductor cross section over its entire axial length is employed and has connected thereto in an electrically conducting manner a predetermined number of conductor elements of predetermined conductor cross section permitting simple metal netting with a large heat exchange area to be used for the normal conductors while allowing the conductor cross section of the normal conductor to be optimized with respect to minimum heat loss.

10 Claims, 3 Drawing Figures

CURRENT FEEDING DEVICE FOR ELECTRICAL APPARATUS WITH CONDUCTORS COOLED TO A LOW TEMPERATURE

BACKGROUND OF THE INVENTION

The invention relates to a current feeding device for electrical apparatus with conductors which are cooled to a low temperature in general and more particularly to a device of this nature utilizing a normal conductor which is cooled by a cold gas and consists of metal netting.

Current feeding devices are required for feeding current into electrical apparatus with conductors cooled to a low temperature. Electric current is fed through such devices to the deep-cooled conductors from a current supply which is at a higher temperature level, e.g., room temperature. Examples of such electrical apparatus are superconducting coils, cables or machines, the conductors of which contain superconductive material which is cooled to a temperature level below what is known as its transition temperature by means of a cryogenic medium e.g., liquid helium. Since this transition temperature of the known superconductive materials is far below room temperature, conductors of electrically normally conducting material such as copper or aluminum are used to bridge the respective temperature differences in the current feeding devices. These normally conducting conductors are then connected to the superconductors of the electrical apparatus at a point which is also kept at a temperature level below the transition temperature of the superconductor material. The normal conductors can be cooled from their portion at room temperature up to this junction gradually or in steps.

One known current feeding device of this nature is described in "Rev.Sci. Instr.", vol. 38, no. 12, December 1967, pages 1776 to 1779. Laminations, wires or netting are used as the normal conducting conductors of this current feeding device. Through these normal conductors, heat is supplied to a helium bath. Part of the liquid helium therefore evaporates and rises as cold helium gas through the conductor laminations or the conductor netting and thus removes the Joule heat produced as well as the heat flowing in from the outside. In this process, the helium gas is warmed up to about room temperature. At the upper junction point of the normal cnductor, which is coupled to an external current supply, the helium gas is collected and can be returned to refrigeration equipment for reliquefication.

If a constant temperature difference is to be maintained between an electric power supply and equipment with deep-cooled conductors, particularly superconductors, a problem therefore arises due to an undesireable heat exchange between the current supply and the deep-cooled conductors taking place through heat conduction through the normal conductors of the current feeding device. If, for instance, a superconductor is connected to a power supply which is at room temperature, considerable amounts of heat also flow into the superconductor or the cryogenic medium cooling it because of the finite heat conductivity of the normal conductor material of the current feeding device i.e. the normal conductor is not only a good electrical conductor but also a good heat conductor. The coolant losses connected with such heat transfer must be kept to a minimum. The requirement of minimizing the flow of heat into the cryogenic medium for the deep-cooled conductors thus exists.

To meet this requirement, an optimum geometric form of the normal conductors can be determined. The metal of the normal conductors must have high electric conductivity; however, its thermal conductivity should be small at the same time. In addition, the cross section must be both large enough that the Joule heat generated is relatively small and also must be small enough that the heat inflow is limited. Furthermore, the surface of the normal conductors, which is cooled by a cold gas, must be as large as possible so that an effective heat exchange with the cold gas is ensured.

A current feeding device in which these requirements are taken into account is described in U.S. Pat. No. 3,610,809. As the normal conductor of this known current feeding device, a wire gauze or a metal braid is provided, for instance. The conductor cross section is reduced in a central part of the current feeding device between its warm and cold end.

If the cross section is changed by appropriate cutting in such a net-like normal conductor the wires of the net which run in the axial direction of the current feeding device are interrupted and the current carried in them must pass to the wires that run in the transversal direction. Braided wire nets, however, only have touch contact between these intersecting wires. Thus, an additional ohmic transition resistance occurs at these cross points. No variations of the conductor cross section can therefore be accomplished with these braided nets without incurring additional ohmic losses and, thereby, also additional coolant losses.

To reduce these transition resistances, the braided metal nets can be soldered at the cross points between their transversally and longitudinally disposed wires (see U.S. Pat. 3,715,452). However, the method of doing this is relatively expensive.

In view of these difficulties, it is therefore an object of the invention to create a current feeding device which can be simply produced. Further, it is a particular object to produce such a device using conventional, braided metal netting without the occurrence of the difficulties mentioned above.

SUMMARY OF THE INVENTION

This problem is solved for a current feeding device of the type mentioned above by using metal netting with a constant cross section over its entire axial length and connecting to it, in an electrically cnducting manner, a predetermined number of conductor elements of predetermined conductor cross section.

The advantages of the current feeding device of the present invention are, in particular, that simple, braided metal netting can be used as the base for the normal conductors and that the normal conductors have a large ratio of heat exchange surface per unit length to the conductor cross section over their entire axial length. The heat exchange with a passing cold gas is then correspondingly large. This ratio is about 800, for instance, for wire netting with four axial and four transversal wires per millimeter and a wire diameter of 0.1 mm each. For a solid cylinder with a diameter of 1 cm, for instance, the same ratio is only 4.

Through selection of the number and width of the conductor elements applied the metal netting on the normal conductor, the conductor cross section of the overall normal conductor can be tailored so that the amount of heat supplied to a coolant bath, particularly a helium bath, and the quantity of exhaust gas associated therewith are minimal for a predetermined operating current and a predetermined axial length of the normal conductor.

In this manner, a current feeding device with a net-like normal conductor, the conductor cross section of which may vary in the longitudinal direction in accordance with an optimizing computation, can be produced in a simple manner. Even when rolled up, the normal conductor remains sufficiently transparent for the cold gas without excessive pressure losses.

The conductor elements in strip form may be soldered to the metal netting. In particular, they can be attached to the metal netting such that they are inclined at an angle to the axis of the current feeding device. The spaces between adjacent strip-like conductor elements on the metal net, when it is rolled up, then form helical cooling canals which improve the heat exchange of the cold gas with the metal netting over that which would be obtained with axial cooling canals.

According to a further advantageous feature of the current feeding device of the present invention, netting strips of a material with a low electric conductivity are attached to the metal perpendicular to the axis of the current feeding device. In particular, these strips may be arranged in a zone of minimum longitudinal conductor cross section of the overall normal conductor, for instance in a zone without additional conductor elements. The advantages of this feature are an increase of the heat capacity of this normal conductor zone. The temperature stability of the current feeding device is thus accordingly improved thereby. In addition, the metal net is easier to roll up because of the more uniform overal thickness of the normal conductor.

DETAILED DESCRIPTION OF THE INVENTION

Figure 1:
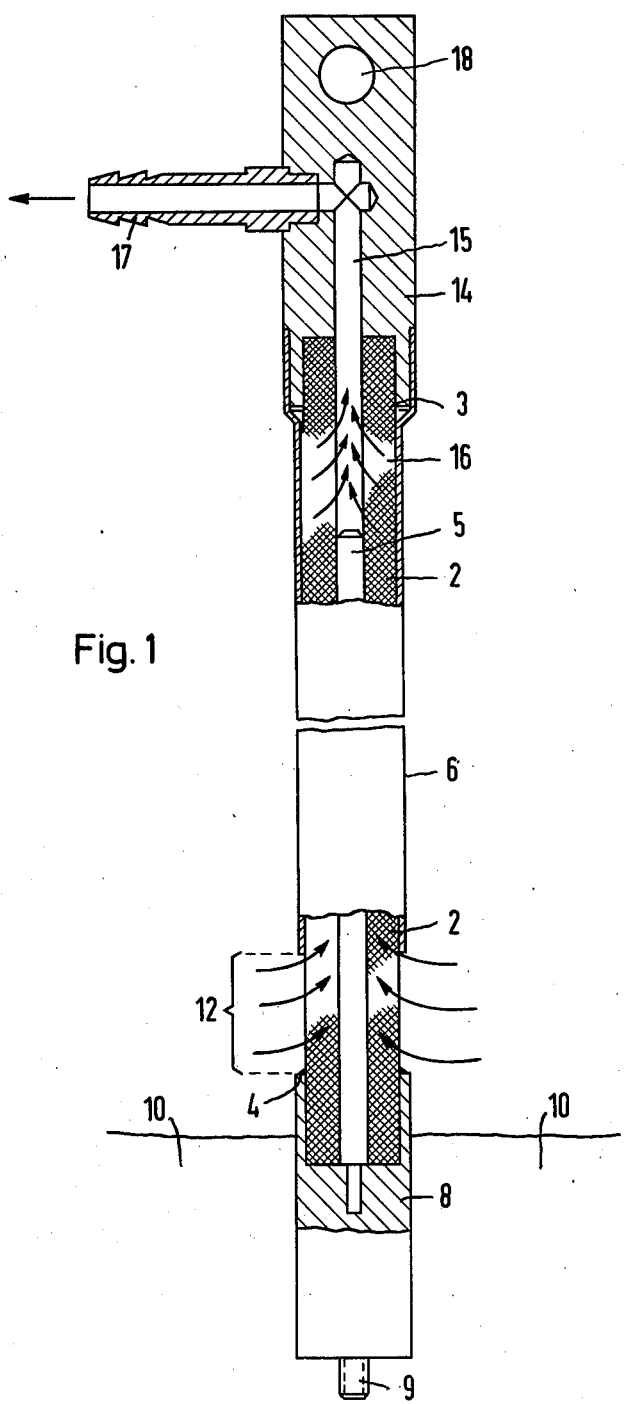
FIG. 1 is a schematic illustration of a current feeding device with a normal conductor in net form.

An electric current can flow through the current feeding device according to the present invention, shown in a longitudinal cross section in FIG. 1 from a power supply at room temperature to an electrical apparatus not detailed in the FIG., e.g., a magnet coil, having conductors which are kept at a low temperature. The deep-cooled conductors of the magnet coil or the electrical apparatus may contain, for instance, super conductive material which is kept below its transition temperature, at which it passes from the superconducting to the normal conducting state, by means of liquid helium. The current feeding device contains a normal conductor 2 in net form disposed between the warm end 3 which is at room temperature and the cold end 4 which is at low temperature. A corresponding temperature gradient develops in the axial direction. The net-like normal conductor 2 is only schematically indicated in FIG. 1. Its details will be described in connection with FIG. 3. It is rolled up around a winding mandrel 5 and is arranged within an enclosure tube 6. The normally conducting net conductor 2 is soldered at its cold end 4 into a copper stud 8 which contains one or more superconductors 9 in its interior and may be, for instance, 50 cm long. Fully stabilized niobium-titanium conductors, which are fabricated as so-called multi-filament conductors may be used as the superconductors 9. The copper stud 8 is arranged in a cryostat, not shown in the Figure in detail, of the electrical apparatus in a helium bath 10 and bridges the entire range between the maximum and minimum helium level of the cryostat. Due to its high thermal conductivity, it therefore maintains an approximately constant temperature of, e.g. 4.2 K, at the cold end 4 of the net conductor, 2 regardless of the prevailing helium level. Because of the superconducting short circuit, the current flows in it without losses.

The rolled up, net-like normal conductor is surrounded by a thin walled steel enclosure tube 6 on the outside. The lower edge of tube 6 ends above the copper rod 8 and therefore leaves a slot 12 free. As indicated by arrows in the figure a cooling gas, e.g., the evaporated exhaust gas of the helium in the bath 10, can get through this slot into the interior of the enclosure tube 6 and therefore, to the rolled up net-like normal conductor 2 and can rise up in the latter.

At the warm end 3 the net conductor 2 and the enclosure tube 6 are soldered to another copper stud 14. In the interior of the net cnductor, a central hole 15 is provided for discharging the warmed cooling gas. To accomplish this the hole 15 extends a few centimeters below the warm end 3 into the normal conductor 2 to a point 16. At this point the cold gas, which rises up through the net conductor 2 and is indicated in the Figure by the arrows, is conducted into the borehole 15. The cold gas can then be returned from a nipple 17 to refrigeration apparatus, not shown.

The central hole 15 extends through the current feeding device to the copper rod 8 at the cold end 4. It is closed off by means of rod of low thermal conductivity, which may consist for instance, of hard fabric. In this manner, a flow short circuit for the cold gas can be prevented. At the same time the rod serves as a winding mandrel 5 for rolling up the net-like normal conductor.

While the normal conductor 2 is being soldered to the stud 14 at the warm end 3, it is advisable to temporarily replace the rod 5 by a temperature resistant auxiliary rod, which does not take solder and does not interfere with the soldering, e.g., a rod of aluminum. This auxiliary rod will advantageously project somewhat beyond the solder joint between the copper stud 14 and the normal conductor 2 into the hole 15 in the copper stud.

The temperature of the current feeding device can be kept constant at a predetermined temperature, e.g., room temperature, at the warm end 3 of the normal conductor 2 by means of an electrical heater control or by means of a liquid or gaseous medium which flows through one or several canals 18 in the copper stud 14 in well known manner.

In addition, a conventional control, not indicated in the figure, for controlling the cooling gas throughout through the current feeding device should in general be provided. The current through the normal conductor 2 and its axial resistance or the voltage drop along the net conductor can be used as control parameters. In addition, it is also possible to measure, with one or more temperature measuring sensors, the temperature deviations from a reference value which occur in the case of insufficient or excessive cooling at predetermined points of the normal conductor and to utilize these measured values to control the flow of the cooling gas.

Figure 2:
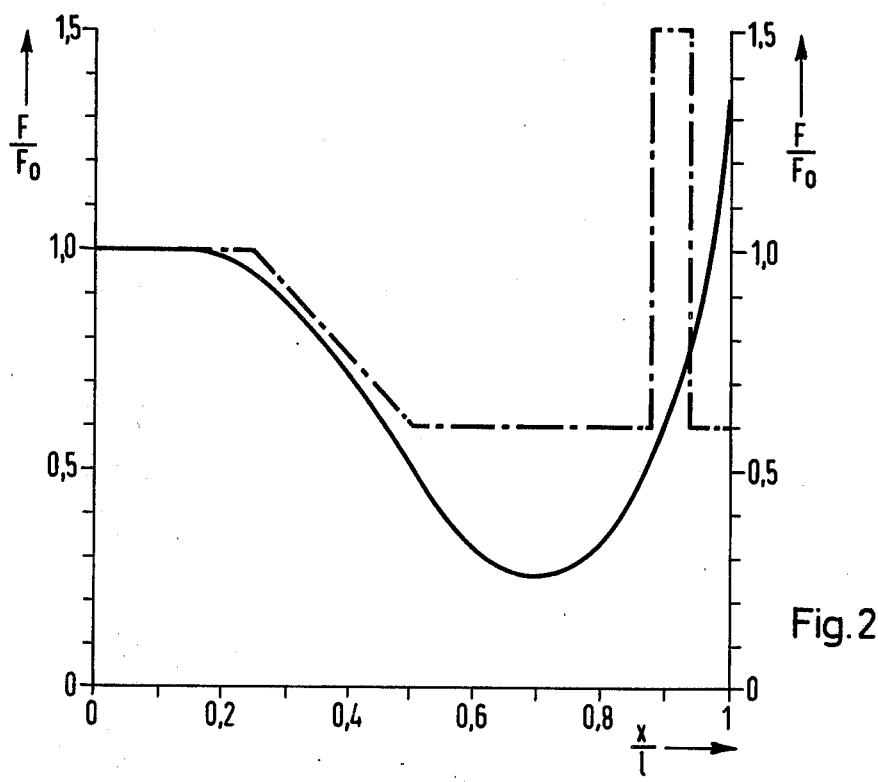
FIG. 2 shows a diagram of the cross section of a normal conductor optimized with respect to minimal coolant losses.

In the diagram of FIG. 2, the cross sectional area F of a net-like normal conductor of a current feeding device according to the present invention is shown as a function of the distance $x$ from the warm end of the net-like normal conductor. On the abscissa the conductor parameter $x/l$ is plotted, where $l$ is the length of the conductor and $x$ the conductor coordinate position measured from the warm end of the normal conductor in the direction toward its cold end which is in the coolant bath of the electrical apparatus. On the ordinate, the cross sectional area F, normalized to the cross section area $F_o$ at the warm end, is plotted, The current feeding device is optimized for a given conductor length 1 and a predetermined operating current, i.e., it has the lowest coolant losses at this current. In the diagram, a curve for an optimized normal conductor is shown, the residual resistance ratio of which is, e.g. 50. As can be seen from this solid curve, the cross section of the current feed must again increase after going through a minimum at about two-thirds of the axial normal conductor length in the region of the residual resistance at low temperatures.

The diagram also illustrates, with a dash-dotted line, an example of the relative cross section area $F/F_o$ of a net-like normal conductor matched to this solid curve. This matched net-like normal conductor is illustrated in further detail in FIG. 3.

Figure 3:
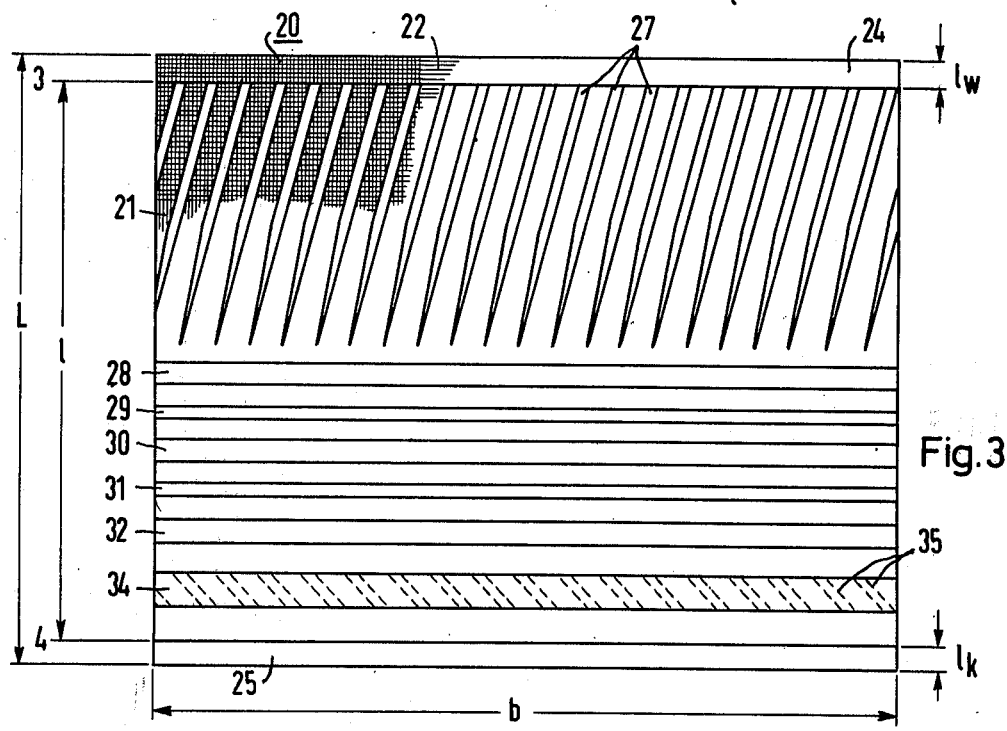
FIG. 3 illustrates a specific embodiment of a normal conductor for the current feeding device of FIG. 1.

According to FIG. 3, this normal conductor of a current feeding device such as shown on FIG. 1 contains a rectangular metal net 20 with an axial length L and the width $b$. The axial length L is composed of the lengths $l$, $l_w$ and $l_k$. The metal net 20, which is only partly detailed on FIG. 3, consists of a braid of copper wires 21 and 22 running axially and transversally. At its upper, warm end 3, a strip 24 of axial length $l_w$ is provided for soldering the net 20 into a copper stud 14 and at its lower, cold end 4, a corresponding strip 25 with an axial length $l_k$ is provided for soldering it into the copper stud 8. A corresponding temperature gradient therefore develops along the axial length $l$ of the net 20. Individual thin strips 27 of copper sheet which are spaced from each other are soldered on to the upper half of the net 20, bordering on the warm end 3. These are conductor elements for the purpose of matching the net to the required conductor cross section of FIG. 2. These additional conductor elements 27 are arranged at an angle to the axial direction. This inclined arrangement facilitates rolling up of the metal net 20 to form a package. To stabilize the temperature equilibrium in the region of the smallest conductor cross section, additional strips 28 to 32 of stainless steel sheet are inserted perpendicular to the axial direction. They may be attached to the metal net 20, for instance, at its edge. These strips increase the total heat capacity without influencing the losses appreciably. In order to permit maximum heat exchange between the cooling gas and the conductors, the metal net must be rolled up as tightly as possible and built into the closely fitting thin walled enclosure tube 6 which is of low thermal conductivity. In the vicinity of the cold end 4, a further copper band 34 is soldered across the metal net 20 transversally. The corresponding soldered seams are indicated in the Figure by dashed lines 35. Through this copper band 34, an increase in the cross section of the entire normal conductor which is necessary at low temperatures because of the residual resistance of the copper material is achieved.

In the embodiment according to the Figures, a current feeding device for a magnet coil with superconductors which are cooled with helium was chosen. However, other corresponding devices for other conductors, cooled to a low temperature, for instance, of aluminum or beryllium which are cooled with other coolants such as hydrogen can also be constructed in accordance with the present invention. These and other modifications can be made without departing from the spirit of the invention which is intended to be limited solely by the appended claims.

What is claimed is:

1. In a current feeding device for electrical apparatus having conductors cooled to a low temperature, which conductors have their end connected to a normal conductor which is cooled by a cold gas and consists of metal netting, the improvement comprising:

The metal net having constant conductor cross section over its entire axial length; and a predetermined number of conductor elements of predetermined conductor cross section connected to said metal net in an electrically conducting manner.

2. Apparatus according to claim 1, wherein said conductor elements comprise thin conductor elements in strip form which are soldered to the metal net.

3. Apparatus according to claim 2, wherein said conductor elements are disposed on the metal net at an angle to the axis of the current feeding device.

4. Apparatus according to claim 2, wherein at least some of said conductor elements are arranged on the metal net perpendicular to the axis of the current feeding device by means of soldered seams which are disposed at an angle to the axis of the current feeding device.

5. Apparatus according to claim 4, wherein others of said conductor elements are disposed on the metal net at an angle to the axis of the current feeding device.

6. Apparatus according to claim 5, wherein the conductor cross sections of said others of said conductor elements vary in the axial direction.

7. Apparatus according to claim 6, and further including strips of a material of low electric conductivity attached to the metal net perpendicular to the axis of the current feeding device.

8. Apparatus according to claim 1, wherein at least some of said conductor elements are arranged on the metal net perpendicular to the axis of the current feeding device by means of soldered seams which are disposed at an angle to the axis of the current feeding device.

9. Apparatus according to claim 1, wherein said conductor elements are disposed on the metal net at an angle to the axis of the current feeding device.

10. Apparatus according to claim 1, wherein the conductor cross sections of said conductor elements vary in the axial direction.

* * * * *